United States Patent [19]
Watkins, Jr.

[11] Patent Number: 6,082,392
[45] Date of Patent: Jul. 4, 2000

[54] DUAL HOSE ASSEMBLY AND CONTROL SYSTEM FOR TRUCK-TO-TRUCK FUEL TRANSFER

[75] Inventor: Robert Watkins, Jr., East Fallowfield, Pa.

[73] Assignee: General Transervice, Inc., Coatesville, Pa.

[21] Appl. No.: 08/941,617

[22] Filed: Sep. 30, 1997

[51] Int. Cl.$^7$ ............... B67D 5/33; B67D 5/378; F16K 37/00; G01M 3/08

[52] U.S. Cl. ............ 137/312; 73/40.5 R; 73/46; 73/49.1; 73/291; 73/304 R; 137/392; 137/393; 137/557; 137/558; 138/104; 138/114; 141/59; 141/83; 141/95; 141/231; 285/123.1; 340/614; 340/619; 340/620

[58] Field of Search ............ 73/40.5 R, 46, 73/49.1, 290 R, 291, 304 R; 137/2, 15, 312, 386, 392, 393, 236.1, 363, 372, 892, 895, 557, 558; 141/18, 59, 83, 95, 96, 231; 138/104, 113, 114; 285/123.1; 405/53, 54, 55, 154; 340/614, 619, 620

[56] References Cited

U.S. PATENT DOCUMENTS

| | | | |
|---|---|---|---|
| 2,787,747 | 3/1957 | Weempe | 141/231 |
| 2,928,436 | 3/1960 | Wendrow et al. | 141/231 |
| 2,948,306 | 8/1960 | Kuraeff | 141/231 |
| 3,721,270 | 3/1973 | Wittgenstein | 138/104 |
| 3,983,913 | 10/1976 | Bower | 141/95 |
| 4,644,780 | 2/1987 | Jeter | 138/104 |
| 4,667,505 | 5/1987 | Sharp | 138/104 |
| 5,265,652 | 11/1993 | Brunella | 137/312 |
| 5,285,829 | 2/1994 | Bravo | 137/312 |
| 5,349,994 | 9/1994 | Koeninger | 141/95 |
| 5,429,159 | 7/1995 | Tees et al. | 141/59 |
| 5,507,326 | 4/1996 | Cadman et al. | 141/59 |
| 5,551,484 | 9/1996 | Charboneau | 138/104 |
| 5,673,732 | 10/1997 | Kenney et al. | 141/95 |

FOREIGN PATENT DOCUMENTS

| | | | |
|---|---|---|---|
| 4124243 | 1/1993 | Germany | 141/231 |
| 2023296 | 12/1979 | United Kingdom | 138/104 |

OTHER PUBLICATIONS

"Introducing Overfill & Retained Product Monitoring For The 21st Century", Intelli Check, pp. 2–3, prior to Sep. 30, 1996.

"Aircraft Refueling Equipment F613 Jet Level Sensor", Parker Hannifin Corp., pp. A302.3B, prior to Sep. 30, 1996.

"Aircraft Refueling Equipment Bottom Loading Shutoff Valves", Parker Hannifin Corp., pp. A305.1A, prior to Sep. 30, 1996.

*Primary Examiner*—George L. Walton
*Attorney, Agent, or Firm*—Ratner & Prestia

[57] ABSTRACT

A hose assembly is provided for transmitting liquid fuel between the fuel tank of a highway truck and the fuel tank of an airport refueler. The assembly comprises inner and outer hoses. The inner hose transmits liquid fuel. A sealed passage is formed between the inner and outer hoses. Each end of the hose assembly is connected to a respective port for transferring the fuel between the highway truck fuel tank and airport refueler tank. The assembly includes at least one sensor port for connecting the passage to sensing means to detect leakage from the inner hose to the passage. A leakage sensing system is coupled to the sensor port for detecting leakage of fuel from the inner hose to the passage and for generating sensor signals. The leakage sensing system includes: (1) a pressure sensor for detecting a change in pressure within the passage, and (2) a liquid sensor for detecting the presence of liquid within the passage. A control mechanism is responsive to the sensor signals for terminating transmission of the fuel when fuel leakage is detected by either the pressure sensor or the liquid sensor.

7 Claims, 3 Drawing Sheets

DUAL HOSE ASSEMBLY AND CONTROL SYSTEM FOR TRUCK-TO-TRUCK FUEL TRANSFER

BACKGROUND OF THE INVENTION

Specialized equipment is used within airports for refueling airplanes. The fuel carriers which are commonly used to transport fuel on highways from the producer to the airport (referred to herein as "highway trucks") are not normally permitted to drive in the often narrow and congested areas in which the airplanes are serviced and fueled. Special "refueler" vehicles are used to navigate through the airport and provide the fuel to the airplanes (such as the "Rampmaster" trucks sold by General Transervice, Inc. of Coatesville, Pa.). These refueler vehicles have characteristics that render them particularly well suited for navigating turns in airports and avoiding accidental contact with airplanes.

It is common for airplane fuel to be delivered to an airport by highway trucks capable of transporting about 7700 gallons of fuel each. The fuel from the truck is typically emptied into an in-ground storage tank (which may contain anywhere from 10 to 30 thousand gallons), via a standard low pressure transfer hose suitable for gravity drop.

Major airports are frequently constructed to have large-capacity above-ground supply systems for aircraft fuel, referred to herein as "fuel farms". The planes may also be refueled by way of hydrants located below the airport ramp. The hydrants are equipped with flow-control valves under the control of the operator to refuel the operator's vehicle (which is referred to as a "hydrant cart".).

Airplanes may also be fueled via truck tankers, by transferring fuel farm fuel into the specialized refueler vehicles. Special control systems have been used to monitor the fuel transfer from the fuel farm to the refueler.

One such control system is the "INTELLICHECK™" monitoring system manufactured by Scully Signal company. The monitor system is used in the fuel farm to monitor the fuel transfer, and cut off the pressurized pump flow out from the fuel farm if the monitor determines that the refueler is filled. The refueler has one or more sensors positionable at the top of the refueler tank which provide input signals to the monitor system. These sensors may, for example, be of the wet probe type (which uses an electronic field) or an optical sensor.

The refueler may have its own safety cutoff for the fuel flow, operating independently of the fuel farm's electronic control system. For example, the above-mentioned "Rampmaster" trucks sold by General Transervice, Inc. of Coatesville, Pa. include jet level sensors, such as those manufactured by the Whittaker Company of North Hollywood, Calif. The jet level sensor normally permits a pressurized jet of fuel to pass from an inlet to an outlet of the jet level sensor, if the fuel level in the refueler tank is below the height of the jet level sensor. The flow from the jet level sensor outlet is used to operate the pilot of a normally opened valve that admits fuel to the refueler tank. If, however, the tank fuel level rises to the height of the jet level sensor, the sensor fills up, and the fuel within the sensor disperses the pressurized jet. Thus, the fuel leaves the sensor at a low pressure; the pilot flow pressure falls below that required to maintain the refueler tank valve in the open position, and the tank valve closes to prevent overflowing.

Airports have been very reluctant to allow any direct transfer of fuel from the highway vehicle to the airport refueler, primarily because of safety and environmental concerns related to the possibility of spillage. The airports have been reluctant to rely on the jet level sensors normally installed in the trucks. For example, a spill could occur, creating a hazardous condition if (1) the refueler tank fuel receiving valve becomes frozen in the open position, (2) the airport refueler fills up, and (3) the highway truck continues to pump the fuel. Another concern is that the hose connecting the highway truck to the airport refueler could rupture and leak or spill fuel on airport surfaces. As a result, direct transfer of fuel from a highway truck to an airport refueler truck has seldom been permitted by airports.

Consequently, the two step procedure of delivering fuel from the highway truck to the fuel farm, and then loading the fuel from the fuel farm to the refueler vehicle remains in use. This two step fuel transfer process is time consuming and expensive.

SUMMARY OF THE INVENTION

The present invention is a hose assembly for transmitting liquid fuel between fuel tanks. The hose assembly comprises an inner hose and an outer hose, the inner hose being adapted for transmitting the liquid fuel. A sealing means is coupled to the inner hose and the outer hose for forming a sealed passage between the inner and outer hoses. A connecting means connects each end of the hose assembly to a respective port for receiving the liquid fuel from a first fuel tank and discharging the liquid fuel to a second fuel tank. The assembly includes at least one sensor port for connecting the passage to sensing means to detect leakage from the inner hose to the passage.

According to another aspect of the invention, a system for transmitting liquid fuel from a transport truck tank to an airport refueler via the hose assembly is provided. The system comprises a hose assembly for transmitting fuel from the transport truck tank to the airport refueler, including: (1) an inner hose and an outer hose, the inner hose adapted for transmitting liquid fuel; (2) sealing means coupled to the inner hose and outer hose for forming a sealed passage therebetween; and (3) means for connecting one end of the hose assembly to a fuel port of the transport truck tank and another end of the hose assembly to a refueler tank within the airport refueler. The assembly includes at least two sensor ports.

A leakage sensing mechanism is coupled to the sensor port for detecting leakage of fuel from the inner hose to the passage and for generating sensor signals. The leakage sensing mechanism includes: (1) pressure sensing means for detecting a change in pressure within the passage, and (2) liquid sensing means for detecting the presence of liquid within the passage.

A control mechanism is responsive to the sensor signals for terminating transmission of the fuel when fuel leakage is detected by either the pressure sensing means or the liquid sensing means.

DETAILED DESCRIPTION OF THE EXEMPLARY EMBODIMENTS

The present invention is a fuel delivery system having improved safety characteristics. System features include an improved hose assembly which allows both leak containment and automated leak detection. According to another aspect of the invention, the system provides electronic monitoring and control components, to detect when the receiving tank has reached the full level, and for automatically cutting off the fuel supply mechanism upon detecting that the receiving fuel tank is full.

Figure 1:
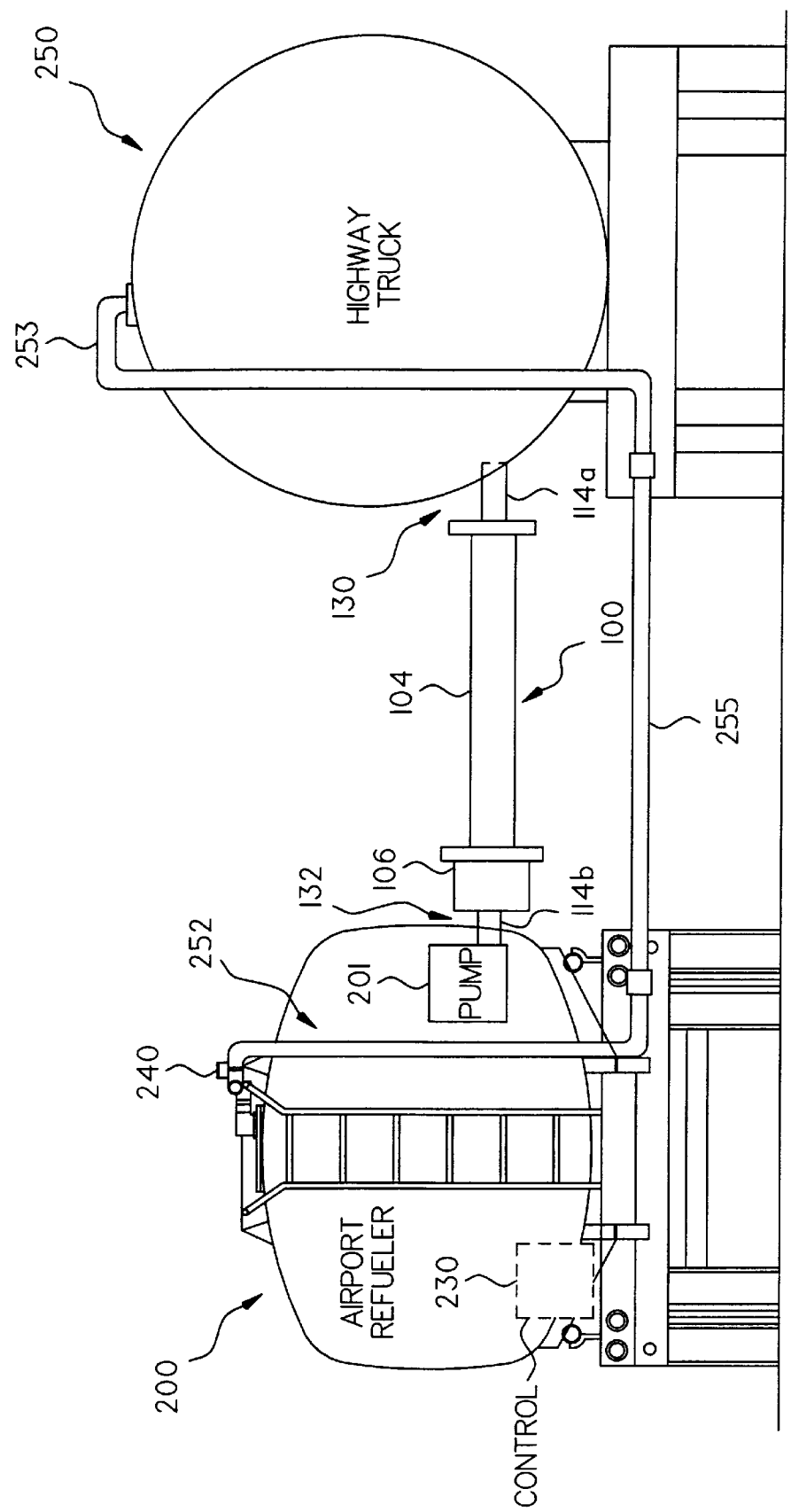
FIG. 1 is a diagram of a refueling system according to the invention.

FIG. 1 shows an exemplary system for transmitting liquid fuel from a fuel tank of transport truck 250 directly to an airport refueler 200. The system comprises a hose assembly 100 for transmitting fuel from the tank of transport truck 250 to the airport refueler 200. Hose assembly 100 includes an inner hose 102 and an outer hose 104. Inner hose 102 is adapted for transmitting the liquid fuel. A sealed passage 103 (shown in FIG. 2) is formed between inner hose 102 and outer hose 104.

One end of hose assembly 100 is coupled to a fuel port of the tank of transport truck 200 the other end of hose assembly 100 is coupled to a fuel port of the tank within airport refueler 250. Assembly 100 includes at least two sensor ports 106d and 106e (shown in FIG. 2). Leakage sensing means are coupled to sensor ports 106d and 106e for detecting leakage of fuel from inner hose 102 to passage 103 and for generating sensor signals. In the exemplary embodiment, the leakage sensing means may include a pressure sensor 108 for detecting a change in pressure within passage 103. Alternatively, the leakage sensing means may include a liquid sensor 110 for detecting the presence of liquid within the passage. As a further alternative, pressure sensor 108 and liquid sensor 110 may both be provided in combination.

A control system 230 is responsive to the signals from sensors 108 and/or 110 for terminating transmission of the fuel when fuel leakage is detected by either pressure sensor 108 or liquid sensor 110.

These and other aspects of the exemplary embodiments are described in detail below.

DUAL WALLED HOSE

One aspect of the invention is a double walled fuel-transfer hose assembly 100 suitable for transferring fuel directly from the highway truck 250 to the airport refueler 200. The hose assembly 100 connects directly to the suction pump 201 of the airport refueler truck 200.

Figure 2:
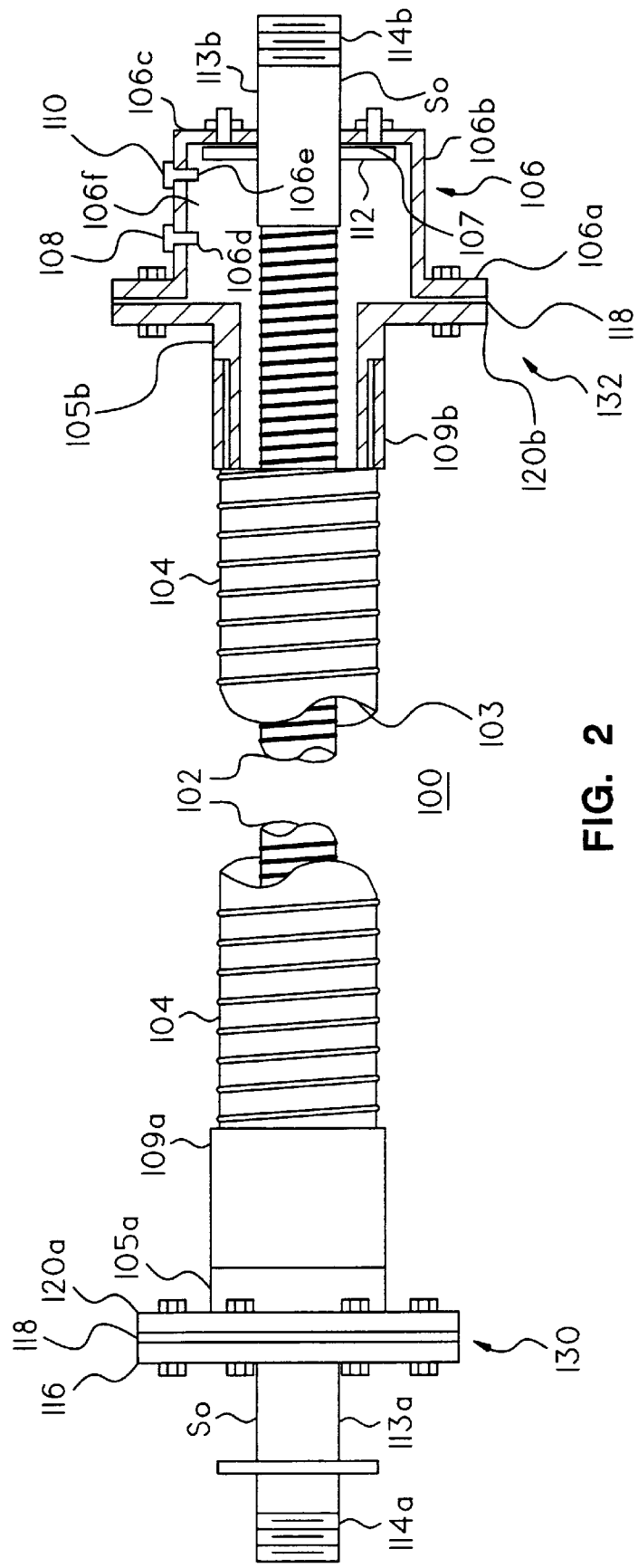
FIG. 2 is a partial cutaway view of the dual walled hose used in the system shown in FIG. 1.
Figure 3:
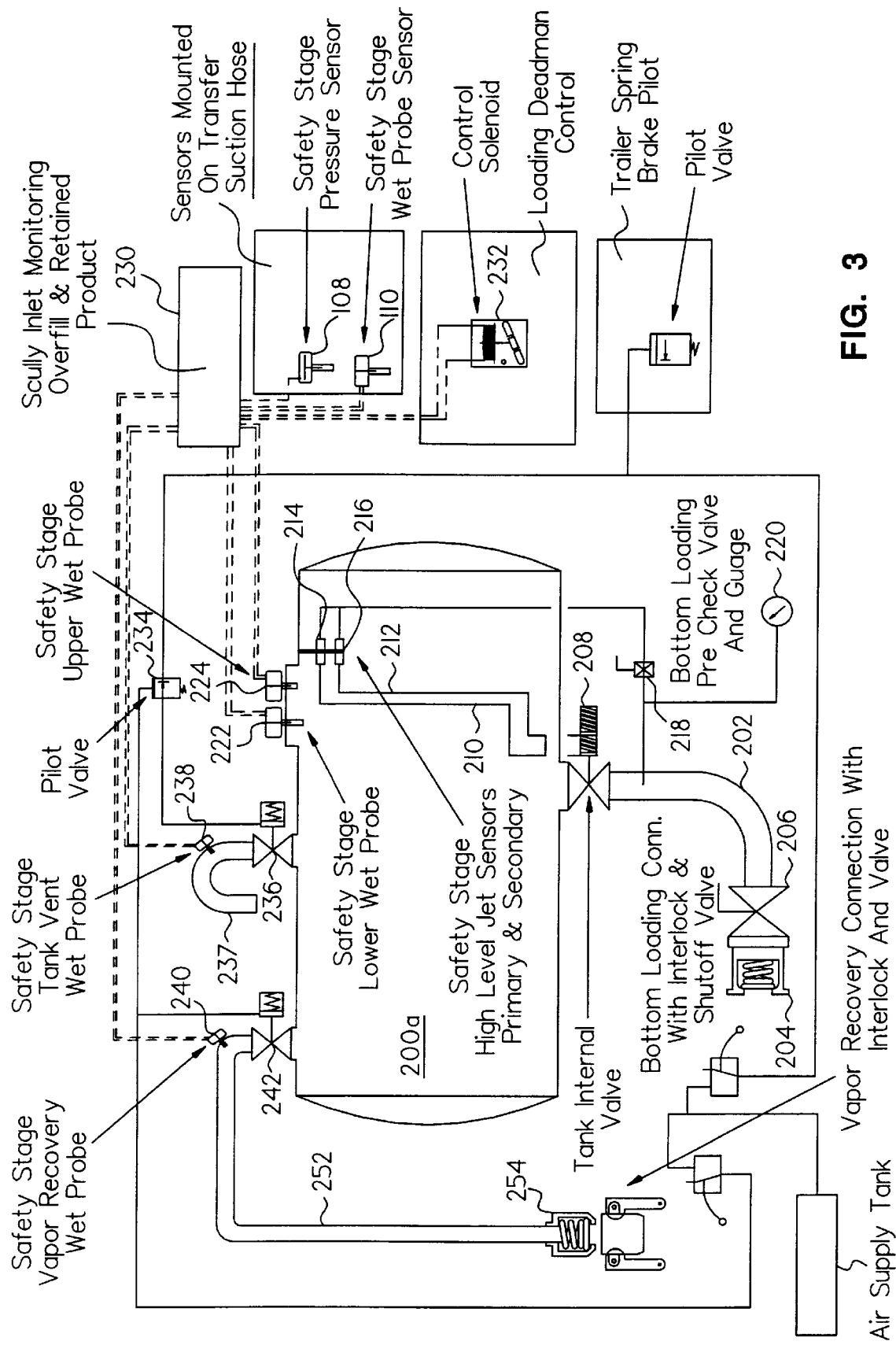
FIG. 3 is a block diagram of a control system used in the refueling system shown in FIG. 1.

FIG. 2 is a partial cutaway view of the dual walled hose assembly 100 used in the system shown in FIG. 1. Hose assembly 100 allows safe transmission of fuel from transport truck 250 to airport refueler 200, by providing a sealed outer passage 103 to: (1) contain any leakage or spilled fuel which may escape from the side wall of the inner hose 102; and (2) allow detection of any fuel leakage or spillage.

Assembly 100 comprises an inner hose 102 and an outer hose 104. Inner hose 102 transmits fuel from a tank of a transport truck 250 to a tank of the airport refueler 200. Inner hose 102 has a hose wall 102a of conventional construction for airplane fuel hoses, which may be a 4 inch composite hose manufactured by Dantec Limited of Delta, British Columbia, Canada. A sealed passage 103 is formed between the inner hose 102 and outer hose 104. Outer hose 104 must be strong enough to contain the pressure of the fuel if a leak forms in inner hose 102. The outer hose may be, for example, a six inch (15 centimeter) composite hose manufactured by Dantec Limited.

Each end of hose 102 is sealingly attached to a conventional ferrule 113a, 113b, for attaching hose 102 to the fuel port of either refueler 200 or highway truck 250. The ferrules 113a, 113b may, for example, have a 4 inch NPT (ANSI/ASME B1.28.1) nipple 114a, 114b for attaching to the fuel ports. Ferrules 113a, 113b may use a conventional flare type joint for attaching the ferrules 113a, 113b to the material of hose 102. In the flare joint, each ferrule 113a and 113b has an outer sleeve $S_o$ and an inner sleeve (not shown). An end of hose 102 is placed between the outer sleeve $S_o$ and inner sleeve. A flaring tool is used to expand the inner sleeve against hose 102, so that hose 102 is compressed between outer sleeve $S_o$ and the inner sleeve to form a sealed joint to the ferrule 113a or 113b.

Each end of hose 104 has a ferrule 105a, 105b, having respective flanges, 120a and 120b, respectively. Hose 104 is sealingly attached to ferrules 105a and 105b. A conventional flare type joint may be used to join hose 104 to ferrules 105a and 105b. This is similar to the type of joint used to sealingly attach ferrules 113a and 113b to hose 102.

Each of the ferrules 105a, 105b, 113a, and 113b has a flange 120a, 120b, 116 and 112, respectively. Flange 112 may be the standard sized flange for a commercially available ferrule for standard 4 inch (10 centimeter) fuel hose. Flanges 120a and 120b may be the standard sized flanges for a commercially available ferrule for 6 inch (15 centimeter) hose. In the exemplary embodiment, flanges 116 and 112 are sized differently from one another. At one end 130 of assembly 100, ferrule 113a has a large flange 116 sized to mate with the flange 120a of ferrule 105a. A suitable seal 118, such as a tetraflouroethylene (TFE) envelope gasket or equivalent thereof, is provided between flanges 116 and 120a to prevent fuel or vapor from escaping.

At the opposite end 132 of hose assembly 100, a bell structure 106 is provided. Bell 106 has the general shape of a stove-pipe hat. Bell structure 106 includes a flange 106a which mates with flange 120b of ferrule 105b. A sealing gasket 118 is provided between flanges 120b and 106a. Bell 106 has a flat face 106c opposite flange 106a. Flange 112 of ferrule 113b sealingly attaches to flat face 106c (with a suitable sealing gasket 107, which may be a TFE envelope gasket). A cavity 106f is formed, which is bounded by flange 120b, hose 102, ferrule 113b, and the inside of bell structure 106. The passage 103 between hose 102 and hose 104 opens into cavity 106f, as shown in FIG. 2.

Bell structure 106 includes one or more sensor ports 106d, 106e into which sensors 108, 110 are mounted to detect leakage from inner hose 102 to passage 103. Sensors 108 and 110 may be a pressure sensor and a liquid sensor, respectively, as described in detail below.

An exemplary method of fabricating hose assembly 100 is as follows. The retaining rings 109a, 109b of outer hose 104 slide over ferrules 105a and 105b. A conventional ball shaped tool is used to flare ferrules 105a and 105b out to sealingly join hose 104 and ferrules 105a and 105b. Inner hose 102 is then placed inside outer hose 104, with inner hose 102 extending beyond ferrules 105a and 105b. Ferrule 113a is placed over one end of hose 102 and a flaring tool (ball) is used to flare out ferrule 113 to sealingly grip hose 102. Flange 116, seal 118 and flange 120a may be fastened together, using bolts or other equivalent fasteners. The other end of hose 102 is placed on ferrule 113b, and ferrule 113b is flared out to sealingly grip hose 102.

Another aspect of the invention is the coupling. The hose assembly 100 is capable of coupling to a standard fuel port of highway truck 250 and the standard fuel port of airport refueler 200. However, according to the invention, nipples 114a, 114b are not attached to hose 102 until after hose 102 is placed inside hose 104. Then, the hose 102 is slid over a ferrule 113a, and a ball shaped tool (not shown) is passed through ferrule 113a to flare the ferrule out and secure hose 102 to ferrule 113a.

According to the invention, large hose 104 slides over small hose 102. Large hose 104 has large flanges 120*a*, 120*b* at either end that are sealingly connected to large hose 104. Small hose 102 has conventional flanges 113*a*, 113*b*, also installed on the ends of the small hose 102 (so that the large hose flanges 120*a*, 120*b* are in between small hose flanges 112). On the highway truck end 130, flanges 116 and 120*a* merely bolt together in a sealing relationship. On the refueler end 132, there is a bell 106. Bell 106 has a flange 106*a* on one end which attaches to the outside of large hose flange 120*b*. The outside of the small hose flange 112 is mounted on the other end 106*c* of bell 106. A pressure sensor 108 is mounted in the first sensor port 106*d* of bell 106. A wet probe 110 for detecting liquid is also mounted in sensor port 106*e* of bell 106.

Although an exemplary application of the dual walled hose for truck-to-truck fuel transfer is described above, one of ordinary skill recognizes that hose assembly 100 may also be used for other applications. For example, the advantages of the dual walled hose described above are also realized if the dual walled hose is used for transfer of fuel between a fuel farm and a truck.

SENSORS

Two sensors are used in hose assembly 100; a wet probe 110 and a pressure sensor 108. Wet probe 110 may be a conventional electric field sensor that senses the presence of liquid. Sensor 110 may be a continuity tester positioned at the same height as the target or it may be an optical sensor.

The pressure probe is adapted to detect a pressure leakage. The inventors have determined that a 200 pound per square inch (psi) pressure load in inner hose 102 would at most result in about a two psi pressure change in outer hose 104, assuming that there is no leakage or rupture between the inner and outer hoses. If, however, there is a leak from hose 102 into passage 103, then a much greater pressure change could result between hoses 102 and 104. According to the invention, any change in pressure between hoses 102 and 104 of more than 3 psi triggers the control system 230 to shut down the pump 201 and stop the fuel transfer. At the same time, any fuel leakage that occurs is contained between hoses 102 and 104 to prevent spillage.

According to the invention, control system 230 can be installed in airport refueler truck 200, which uses a controlled vacuum pump 201 to draw the fuel from the highway truck 250 (by suction) to refueler 200. Thus, the pressure in inner hose 200 is below atmospheric pressure. Because the pressure in passage 103 (between hoses 102 and 104) is normally about atmospheric pressure, control system 230 looks for a pressure drop in between hoses 102 and 104.

On the other hand, if pump 201 is (optionally) located in the highway truck 250, positive pump pressure would be applied to transfer fuel out of highway truck 250, and control system 230 would detect a leakage situation if there is a positive pressure gradient in between hoses 102 and 104.

CONTROL SYSTEM

Control system 230 may include a special purpose monitor, such as a conventional Scully Intel Monitor (dead man control) 230. In the past, Scully type monitors have never been used to control a pump that is contained in and movable with the airport refueler 200. Such monitors were only used to control fixed location pumps that were positioned with and fixed to the fuel farms.

Further, according to the present invention, control system 230 provides seven levels of protection to prevent any chance of fuel leakage.

Pressure sensor 108 detects leakage from hose 102. Control system 230 automatically stops pump 201, if a sudden pressure change or spike of more than three psi is detected in passage 103, between inner hose 102 and outer hose 104.

Wet probe 110 detects liquid between hoses 102 and 104. Control system 230 automatically shuts off pump 201 if liquid is detected in passage 103, between inner hose 102 and outer hose 104. Thus, wet probe 110 can detect liquid fuel in passage 103 even if both hoses 102 and 104 leak (in which case, there may not be a pressure change in passage 103). Wet probe 110 provides an additional level of safety.

A hydraulic compartment valve 208 is provided with two jet level sensors 214 and 216, which may be conventional Whittaker jet level sensors. Sensors 214 and 216 have no moving parts. When sensors 214 and 216 are not submerged, a pressurized jet passes through the sensors, to provide a pilot flow that keeps the compartment valve open. When either jet level sensor 214 or 216 is submerged, the jet is disturbed, so that the pilot flow leaving the sensor is reduced or stopped completely. More specifically, when lower jet level sensor 216 is submerged, sensor 216 acts to partially reduce the fuel flow rate. On the other hand, if upper sensor 214 is submerged, valve 208 shuts down the fuel flow rate completely. Compartment valve 208 closes as the fuel flow is shut off.

Due to the design of the jet flow sensors 214 and 216, if either jet flow sensor 214 or 216 clogs up, the flow rate will at least be reduced. Moreover, if upper jet flow sensor 214 clogs up, the pilot flow would be interrupted and valve 208 shuts off, so that a clogging of sensor 214 and/or 216 could not cause spillage. Only if compartment valve 208 froze open could the flow continue after jet level sensors 214 and 216 are submerged. This whole hydraulic control system operates independently of the monitoring system 230, and continues to function, even if there is a loss of power or a complete failure of the electronic control system (including failure of sensors 108 and 110, or monitor 230. In the event of a complete power failure or failure of any of the sensors 108, 110, or the electric control system described below, compartment valve system 208 would still be effective to shut off the fuel flow to prevent spillage in the event that the tank 200*a* of airport refueler 200 overfills.

Within airport refueler truck 200, two further wet probes 222 and 224 monitor the level of the liquid in the tank 200*a*. The low level wet probe 222 is the primary probe within the tank. When low level wet probe 222 indicates that the fuel level within tank 200*a* of airport refueler 200 is at the low level, pump 201 shuts off, to prevent overfilling of the refueler vehicle. In the event of a failure of low level probe 222, there is a redundant high level wet probe 224, which detects when the fuel level reaches a higher level within tank 200*a*. These two probes 222 and 224 can detect an overfill condition and prevent spillage, even in the event of a failure of jet level sensors 214 and 216 or compartment valve 208. The signals from wet probes 222 and 224 are transmitted to control system 230. In response to the signals from wet probes 222 and 224, control system 230 can automatically shut off pump 201 any time the fuel level in tank 200*a* reaches the height of wet probes 222 and 224.

Airport refueler truck 200 has an atmospheric vent 237 sticking out of the top of tank 200*a*. A fourth wet probe 238 is placed in atmospheric vent 237. If wet probe 238 detects any liquid passing through atmospheric vent 238, pump 201 shuts off, to prevent overflowing of tank 200*a* of refueler vehicle 200. In the event of a failure of low and high level wet probes 222 and 224 and either of jet level sensors 214 and 216 or compartment valve 208, wet probe 238 provides the further safety capability of detecting when the fuel level reaches the height of atmospheric vent 237. The signals from wet probe 238 are transmitted to control system 230. In response to the signals from wet probe 238, control system 230 can automatically shut off pump 201 any time the fuel level in tank 200*a* reaches the height of wet probe 238.

In a conventional highway truck design, when the fuel is pumped into the tank of highway truck 250, the fuel displaces vapor in the tank. The vapor is recovered from the top of the tank by the vapor recovery tube 252 which returns the vapor to the supply source. According to another aspect of the present invention, the vapor recovery tube 252 (which is provided on conventional highway trucks) may be used to perform additional safety functions.

In the present invention, when fuel is pumped from highway truck 250 to refueler tank 200*a*, displaced vapor is returned to highway truck 250 via vapor recovery tube 252. Moreover, a fifth wet probe 240 is placed in vapor recovery tube 252. In the event of a failure of the low and high level wet probes 222 and 224, the atmospheric vent probe 238, and either the jet level sensors 214 or 216 or compartment valve 208, this provides further redundancy which will detect when the fuel level reaches the height of the wet probe 240 in vapor recovery tube 252. The signals from wet probe 240 are transmitted to control system 230. In response to the signals from wet probe 240, control system 230 can automatically shut off pump 201 any time the fuel level in tank 200*a* reaches the height of wet probe 240.

In the event that all of the above safety systems were simultaneously deactivated or failed to operate for any reason whatsoever (so that none of the cutoff valves 206 or 208 shut off the fuel flow), and refueler tank 200*a* fills up completely, the vapor recovery tubes 252 and 253 of highway truck 250 and airport refueler 200, respectively, are connected together by a coupling 255 (which may, for example, be a hose or pipe), so that any fuel which overflows from the top of tank 200*a* of airport refueler 200 is harmlessly returned back to the highway truck 250.

In summary, the present invention provides a mobile "fuel farm" on wheels with eight levels of fuel loading safety, including:

a) Within hose assembly 100
  i) a pressure sensor 108
  ii) a wet probe 110
  iii) an outer hose 104 forming a fuel/vapor recovery passage 103 between the inner and outer hoses 102 and 104.
b) Within tank 200*a*
  i) two jet level sensors 214 and 216,
  ii) a low wet probe 222 and a high wet probe 224,
  iii) a tank vent wet probe 238,
  iv) a vapor recovery tube wet probe 240, and
  v) a coupling 255 connecting the vapor recovery tubes of the highway truck and the refueler; and Although the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A system for transmitting liquid fuel from a transport truck tank to an airport refueler, comprising:
  a hose assembly for transmitting fuel from the transport truck tank to the airport refueler, including:
    an inner hose and an outer hose, the inner hose being adapted for transmitting liquid fuel,
    sealing means coupled to the inner hose and outer hose for forming a sealed passage therebetween, and
    means for connecting one end of the hose assembly to a fuel port of the transport truck tank and another end of the hose assembly to a refueler tank within the airport refueler,
  said assembly including at least two sensor ports;
  leakage sensing means coupled to the sensor ports for detecting leakage of fuel from the inner hose to the passage and for generating sensor signals, including:
    pressure sending means for detecting a change in pressure within the passage, and
    liquid sensing means for detecting the presence of liquid within the passage;
  control means responsive to the sensor signals for terminating transmission of the fuel when fuel leakage is detected by either one of the group consisting of the pressure sensing means and the liquid sensing means;
  fuel level detection means within the refueler tank for detecting when a fuel level within the refueler tank is equal to or greater than a threshold level and generating alarm signals therefrom;
  wherein the control means are responsive to the alarm signals for terminating transmission of the fuel when the fuel level in the refueler tank reaches the threshold level,
  the fuel level detection means include refueler liquid sensing means for detecting fuel at the threshold level within the refueler tank,
  the refueler tank has an atmospheric vent,
  the fuel level detection means further include vent liquid sensing means for detecting fuel at a level of the atmospheric vent, and for generating and transmitting vent alarm signals based on said detection, and
  said control means are responsive to the vent alarm signals for terminating transmission of the fuel when the fuel level in the refueler tank reaches the level of the atmospheric vent.

2. A system for transmitting liquid fuel from a transport truck tank to an airport refueler, comprising:
  a hose assembly for transmitting fuel from the transport truck tank to the airport refueler, including:
    an inner hose and an outer hose, the inner hose being adapted for transmitting liquid fuel,
    sealing means coupled to the inner hose and outer hose for forming a sealed passage therebetween, and
    means for connecting one end of the hose assembly to a fuel port of the transport truck tank and another end of the hose assembly to a refueler tank within the airport refueler,
  said assembly including at least two sensor ports;
  leakage sensing means coupled to the sensor ports for detecting leakage of fuel from the inner hose to the passage and for generating sensor signals, including:
    pressure sensing means for detecting a change in pressure within the passage, and
    liquid sensing means for detecting the presence of liquid within the passage;
  control means responsive to the sensor signals for terminating transmission of the fuel when fuel leakage is detected by either one of the group consisting of the pressure sensing means and the liquid sensing means;
  fuel level detection means within the refueler tank for detecting when a fuel level within the refueler tank is equal to or greater than a threshold level and generating alarm signals therefrom;

wherein the control means are responsive to the alarm signals for terminating transmission of the fuel when the fuel level in the refueler tank reaches the threshold level, the fuel level detection means include refueler liquid sensing means for detecting fuel at the threshold level within the refueler tank, the refueler tank has a vapor recovery port, the fuel level detection means further include vapor recovery port liquid sensing means for detecting fuel at a level of the vapor recovery port, and for generating and transmitting vapor recovery port alarm signals based on said detection, and said control means are responsive to the vapor recovery port alarm signals for terminating transmission of the fuel when the fuel level in the refueler tank reaches the vapor recovery port.

3. A system for transmitting liquid fuel from a transport truck tank to an airport refueler, comprising:

a hose assembly for transmitting fuel from the transport truck tank to the airport refueler, including:

an inner hose and an outer hose, the inner hose being adapted for transmitting liquid fuel, sealing means coupled to the inner hose and outer hose for forming a sealed passage therebetween, and means for connecting one end of the hose assembly to a fuel port of the transport truck tank and another end of the hose assembly to a refueler tank within the airport refueler, said assembly including at least two sensor ports;

leakage sensing means coupled to the sensor ports for detecting leakage of fuel from the inner hose to the passage and for generating sensor signals, including:

pressure sensing means for detecting a change in pressure within the passage, and liquid sensing means for detecting the presence of liquid within the passage;

control means responsive to the sensor signals for terminating transmission of the fuel when fuel leakage is detected by either one of the group consisting of the pressure sensing means and the liquid sensing means; and fuel level detection means within the refueler tank for detecting when a fuel level within the refueler tank is equal to or greater than a threshold level and generating alarm signals therefrom;

wherein the control means are responsive to the alarm signals for terminating transmission of the fuel when the fuel level in the refueler tank reaches the threshold level, and wherein the transport truck tank and the refueler tank each have a respective vapor recovery port, the system further comprising means for transmitting liquid fuel from the vapor recovery port of the refueler tank to the vapor recovery port of the transport truck tank in the event of a failure of any one of the group consisting of the fuel level detection means and the control means.

4. A system for transmitting liquid fuel from a transport truck tank to an airport refueler, comprising:

a hose assembly for transmitting fuel from the transport truck tank to the airport refueler, including:

an inner hose and an outer hose, the inner hose being adapted for transmitting liquid fuel, sealing means coupled to the inner hose and outer hose for forming a sealed passage therebetween, and means for connecting one end of the hose assembly to a fuel port of the transport truck tank and another end of the hose assembly to a refueler tank within the airport refueler, said assembly including at least two sensor ports;

leakage sensing means coupled to the sensor ports for detecting leakage of fuel from the inner hose to the passage and for generating sensor signals, including:

pressure sensing means for detecting a change in pressure within the passage, and liquid sensing means for detecting the presence of liquid within the passage;

control means responsive to the sensor signals for terminating transmission of the fuel when fuel leakage is detected by either one of the group consisting of the pressure sensing means and the liquid sensing means; and the refueler tank includes:

valve means responsive to a pilot flow for admitting fuel into the refueler tank, and a jet level sensor, located at a jet level sensor height, for providing the pilot flow to the valve means only while a fuel level within the refueler tank is below the jet sensor height, wherein said pilot flow is interrupted if the fuel level within the refueler tank reaches the jet level sensor height, thereby causing said valve means to terminate flow of fuel into said refueler tank.

5. A control system for controlling flow of liquid fuel from a transport truck tank to an airport refueler having a refueler tank with an atmospheric vent and a vapor recovery port, comprising:

fuel level liquid detection means within the refueler tank for detecting when a fuel level within the refueler tank is equal to or greater than a threshold level and generating and transmitting level alarm signals when the fuel level reaches the threshold level;

vent liquid sensing means for detecting fuel at a level of the atmospheric vent, and for generating and transmitting vent alarm signals when the fuel level reaches the atmospheric vent;

vapor recovery port liquid sensing means for detecting fuel at a level of the vapor recovery port, and for generating and transmitting vapor recovery port alarm signals when the fuel level reaches the vapor recovery port, and control means responsive to any one of the group consisting of the level alarm signals, the vent alarm signals and the vapor recovery port alarm signals, for terminating transmission of the fuel to the refueler tank.

6. A system according to claim 5, wherein the refueler tank includes:

valve means responsive to a pilot flow for admitting fuel into the refueler tank, and a jet level sensor, located at a jet level sensor height, for providing the pilot flow to the valve means only while a fuel level within the refueler tank is below the jet sensor height, wherein said pilot flow is interrupted if the fuel level within the refueler tank reaches the jet level sensor height, thereby causing said valve means to terminate flow of fuel into said refueler tank.

7. A system for transmitting liquid fuel from a mobile highway truck having a truck tank to a mobile airport refueler having a refueler tank, comprising:

a hose assembly for transmitting fuel from the truck tank to the refueler tank, including:

an inner hose and an outer hose, the inner hose being adapted for transmitting liquid fuel, a sealed passage formed between the inner hose and the outer hose, and a releasable connection between one end of the hose assembly and a fuel port of the truck tank, and another connection between another end of the hose assembly and the refueler tank;

at least one leakage sensor coupled to the hose assembly for detecting leakage of fuel from the inner hose to the passage;

said refueler tank including a vapor recovery port and a conduit coupled between the vapor recovery port and the truck tank for recovering fuel from the vapor recovery port to the truck tank;

a vapor recovery port liquid sensor for detecting fuel at a predetermined level; and a controller responsive to at least one of the leakage sensor and the vapor recovery port liquid sensor for terminating transmission of the fuel when, respectively, fuel leakage is detected by the leakage sensor and fuel is detected at the predetermined level.

* * * * *